United States Patent Office 3,520,133
Patented July 14, 1970

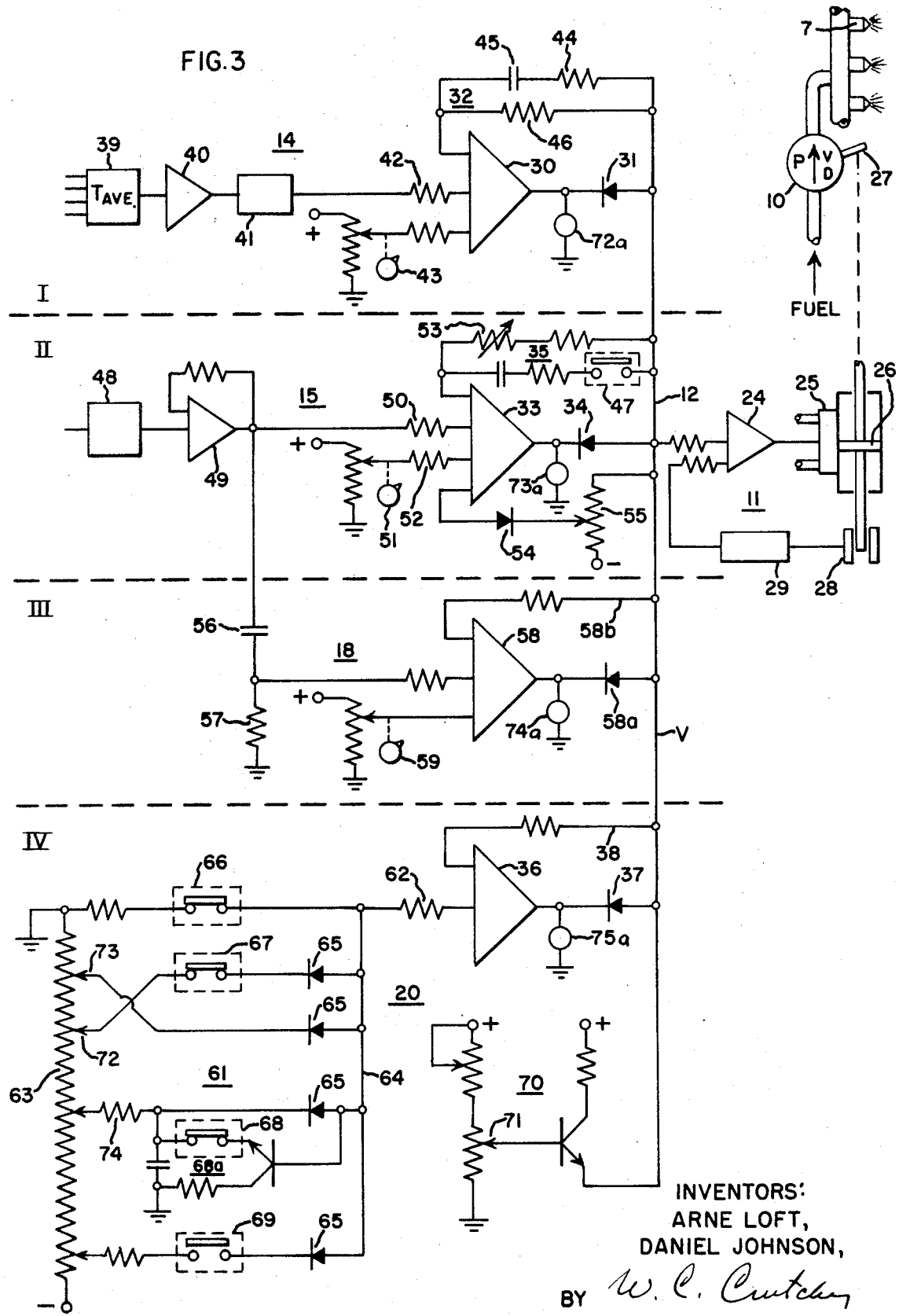

3,520,133
GAS TURBINE CONTROL SYSTEM
Arne Loft, Scotia, and Daniel Johnson, Schenectady, N.Y.,
assignors to General Electric Company, a corporation
of New York
Filed Mar. 14, 1968, Ser. No. 713,107
Int. Cl. F02c 9/06, 7/26
U.S. Cl. 60—39.14    7 Claims

ABSTRACT OF THE DISCLOSURE

An integrated gas-turbine control system providing for open loop event-sequenced or programmed start-up control with a plurality of closed loop constraints simultaneously controlling the gas turbine in accordance with operating conditions such as temperature, speed and acceleration.

BACKGROUND OF THE INVENTION

Complex controls have evolved over the years for gas turbines, both of the single shaft and two-shaft industrial type. Such controls normally incorporate means to influence the rate of fuel flow to the gas turbine's combustion chambers in accordance with various operating parameters such as temperature, compressor pressure, speed, load, and time derivatives of these quantities. A great deal of literature exists in the field of controlling startup of aircraft gas turbines in accordance with a minimum time program with limiting features to prevent occurrence of the surge phenomenon. Also in the industrial gas turbine field, there have been various suggestions for controlling an industrial gas turbine in accordance with the load thereon without exceeding prescribed over-temperature limits which would occur if the gas turbine were loaded beyond its full rating under various ambient conditions.

The advent of remote unattended industrial gas turbine powerplants, particularly for electric utility peaking service, has brought forth the need for automatically controlled minimum time startup. Also, for safety reasons, it is desirable to have as many protective or back-up controls as economically feasible without impairing reliability.

Industrial gas turbines are intended to have a much longer life in service than aircraft gas turbines. Hence, startup controls are desired which, while starting the turbine as rapidly as possible, will allow for cold versus hot start-up and which will minimize thermal shock resulting from temperature transients.

Accordingly, one objects of the present invention is to provide an improved gas turbine control system which integrates the startup and operating functions in an automatic solid state electronic control system.

Another object of the invention is to provide an improved gas turbine control system which will bring the turbine up to rated speed as rapidly as possible with minimum stress from temperature transients.

Still another object of the invention is an improved gas turbine control system which controls fuel in accordance with an event-sequenced program together with closed loop control by one or more operating conditions, utilizing the non-controlling operating conditions for protective backup against excessive temperature stress or loss of load.

SUMMARY OF THE INVENTION

Briefly stated, the invention is practiced by applying to an electrical gating device a plurality of electrical fuel control signals over a full range of operating conditions of the gas turbine, each of the signals being intended to control over a different operating range. The gate allows only the lowest-valued signal to control fuel. One fuel control signal is arranged to follow a predetermined program in accordance with selected events. The remainder of the signals are determined by comparison of operating conditions with selected set points.

DESCRIPTION OF THE DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing in which:

FIG. 3 is a simplified version of a DC analog control for carrying out the objects of the invention.

DESCRIPTION OF THE PREFERRED EMBODIMENT

Figure 1:
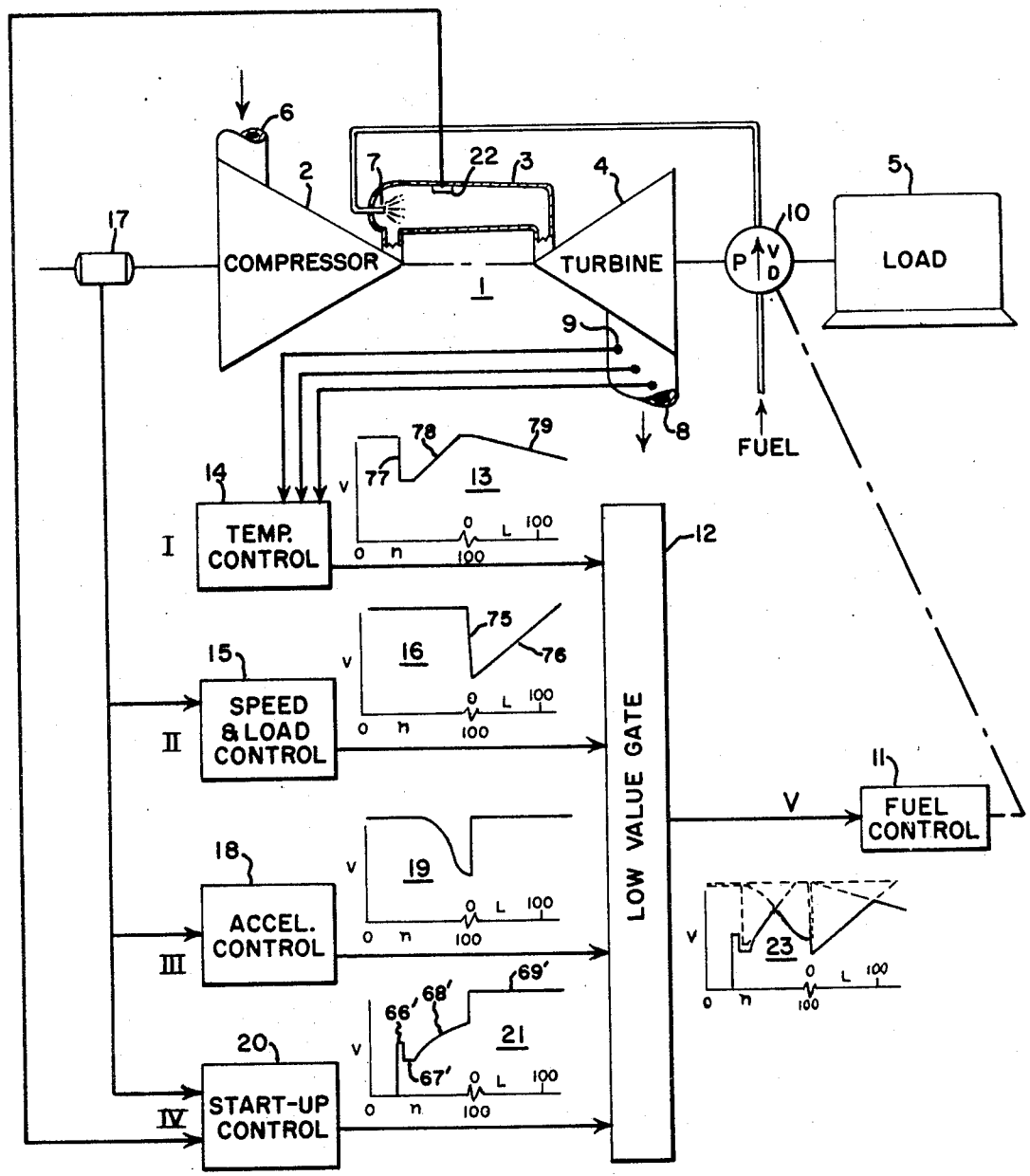
FIG. 1 is a simplified functional schematic drawing of the control system applied to a single shaft gas turbine.

Referring to FIG. 1 of the drawing, a simplified representation of a single shaft gas turbine, shown generally as 1, includes a compressor 2, combustion chamber 3, and turbine 4 connected to drive a load 5. Air entering the compressor inlet at 6 supports the combustion of fuel injected by nozzle 7. The heated exhaust gases exit from turbine outlet 8 past distributed temperature sensors such as 9 measuring exhaust temperature. A shaft-driven variable delivery fuel pump 10 delivers fuel to nozzle 7 at a rate of fuel flow which depends both upon the rotational shaft speed of the gas turbine 1 and the pump stroke set by a fuel control servo 11. The details of the fuel control servo 11 are not material to the present invention since it may include any servo-mechanism which positions the stroke-setting control on the pump at a position corresponding to an electrical positioning signal, there being many devices on the market suitable for such use. Also since the gas turbine may utilize gaseous fuel, in which case a gas valve position would control fuel flow to the combustion chamber, the term "fuel control signal" is used to designate the signal regardless of the type of fuel used.

The fuel control signal is a single-valued electrical signal applied to fuel control 11 by a low value gate 12 and obtained from one of a number of input signals applied to the gate, each intended to have preference over a certain phase of gas turbine operation. A temperature control signal function similar to graph 13 is obtained from the temperature control 14 responsive to the exhaust temperature sensors 9. A speed and load control signal function similar to graph 16 is obtained from the speed and load control 15. Speed sensing is provided by an inductor alternator 17 on the shaft which produces an electrical signal having frequency directly proportional to turbine speed.

An acceleration control 18 produces an acceleration signal responsive function similar to graph 19 which is designed to limit turbine acceleration during startup or during loss of load. A start-up control 20 produces a programmed fuel control signal as indicated by graph 21. The program is determined by events which are sensed from various sources. The arrangement shown uses various speeds as inputs indicated by the tachometer 17 as well as presence of flame in the combustion chamber caused by flame detector 22.

It will be observed that the abscissa for graphs 13, 16, 19 and 21 covers two different phases of gas turbine operation and has two different scales, i.e., speed $n$ from 0 to 100% rated speed, and load L from 0 to a load in excess of 100% standard rated load. The ordinate V is the fuel control signal which is related to the percent stroke of the fuel control pump 10 by the characteristics of the fuel control 11.

The output of low value gate 12 is a single-valued function shown in solid line on a graph 23, while the redundant or non-controlling signals are shown in dotted lines. It will be apparent that the solid line represents the lowest rate of fuel flow during any given phase of operation.

The low value gate functions so that only one of the four control channels, designated by numerals I, II, III, IV, actually determines the fuel flow at any one time. This may be better understood by reference to FIG. 2, where the events and control modes of a typical start-up and loading of a gas turbine are shown.

The abscissa is a time scale, with the channel which is in control indicated by numerals I, II, III and IV corresponding with the control units in FIG. 1. The ordinate is in terms of percent of rated sped (solid line $n$) and in terms of percent of full fuel control signal (dot-dash line V). The various events are noted with letters A through I.

| Point | Event | Subsequent action |
|---|---|---|
| A | Turbine at rest | Crank turbine at zero fuel. Start-up control mode IV. |
| B | Turbine at firing speed | Apply fuel and ignition. |
| C | Flame detected | Reduce fuel flow. Commence acceleration on own power power under start-up program. |
| D | Temperature limited | Shift to temperature-control mode I. |
| E | Acceleration limited | Shift to acceleration control mode III. |
| F | At rated speed | Shift to speed/load control mode II. |
| G | Loading initiated | Apply load to turbine. |
| H | Temperature limited | Shift to temperature control mode I. |

Figure 2:
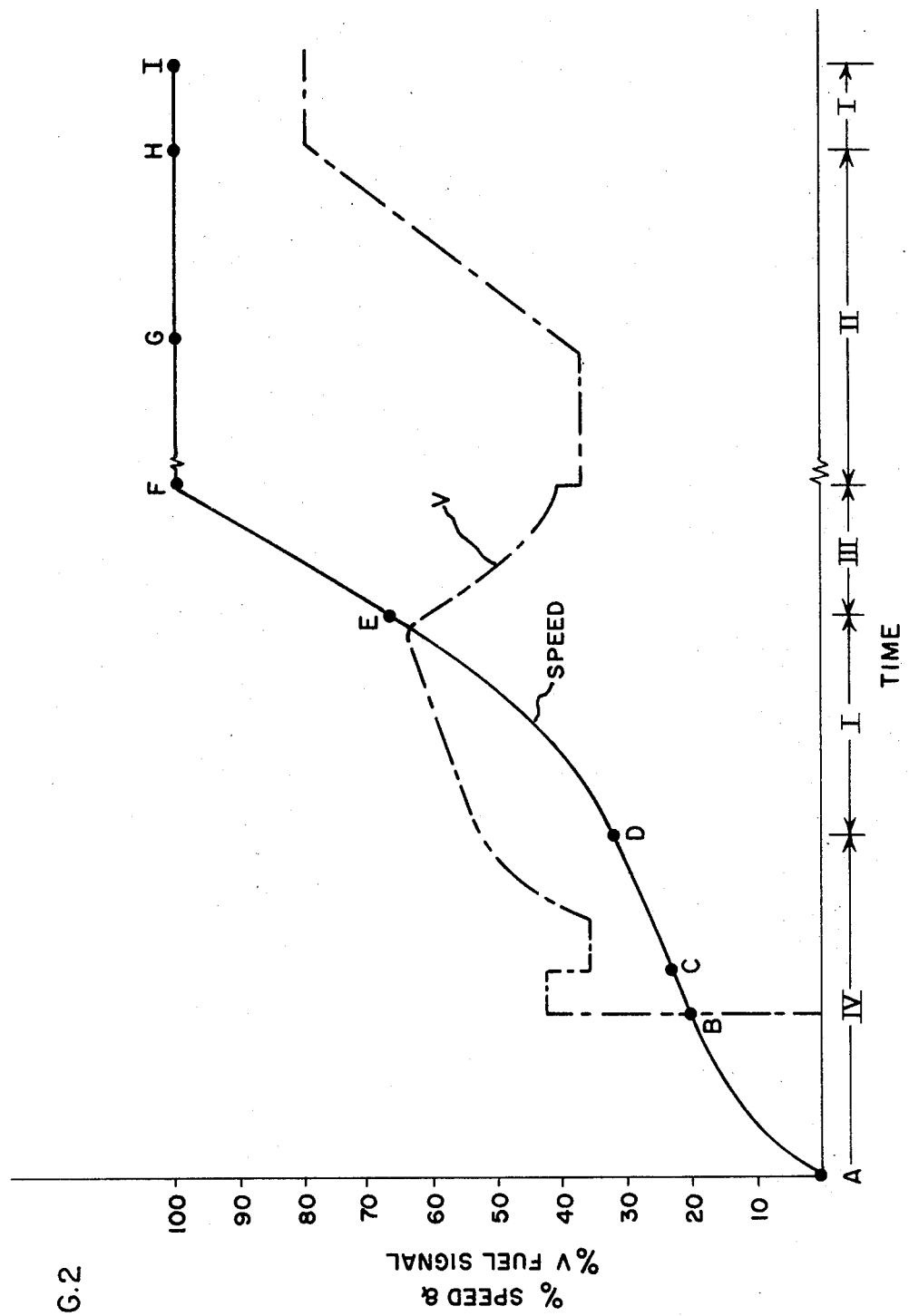
FIG. 2 is a graph illustrating a desired startup and operating curve for showing typical speed and fuel control signal curves.

Reference to FIG. 3 of the drawing shows a very simplified DC analog control schematic for carrying out the functions depicted in FIGS. 1 and 2, it being understood that certain necessary functions which are immaterial to the description of the present invention are omitted for simplicity and in order not to obscure the invention. In FIG. 3, certain simplifications have been introduced. Adjustable voltage reference sources have been indicated as variable tap potentiometers connected a voltage source and ground. In practice, they could also include suitable combinations of digital switching devices to provide connection to various voltage levels. Also, the switching devices in FIG. 3 are depicted as make-and-break contactors with physical armatures; whereas in actuality, they may be solid state switching devices controlled in accordance with a logic system, the details of which are not material to the present invention. Hence, when it is said that such and such a relay is opened or closed upon the turbine attaining a given speed level, for example, it will be understood that suitable solid state switching devices are available for interrupting current flow at a voltage proportional to a preselected speed.

Turning now to FIG. 3, a temperature control 14, a speed and load control 15, an acceleration control 18 and a start-up control 20 are all connected to a common load 12 which serves as a bus for the low value gate to supply a single-valued function V to the fuel conrtol 11. Fuel control 11 is shown simply as an operational amplifier 24 having its output connected to control a hydraulic servo valve 25 supplying fluid to position a piston 26.

The piston 26 sets the stroke of variable delivery pump 10, symbolically indicated by connection to a handle 27. Also the actual position of piston 26 is sensed by an LVDT (linear variable differential transformer) 28, whose signal is demodulated at 29 to provide a feedback signal proportional to position of the piston. Therefore, the fuel control 11, in its simplest form shown, causes the fuel pump 10 to deliver fuel at a rate related to the DC voltage V on the common lead 12 (assuming constant pump speed). A gas turbine operating on natural gas would substitute a gas valve for pump 10.

The four control devices 14, 15, 18, 20 are electrically connected to the common lead 12 so that it functions as a low value gate, i.e., such that the fuel control signal can be no higher than the lowest control signal supplied thereto.

Specifically, temperature control 14 includes an operational amplifier 30 connected to lead 12 via diode 31, and having a feedback circuit 32. The speed and load control 15 includes an operational amplifier 33 connected to lead 12 via diode 34 with a feedback circuit 35. Acceleration control 18 includes an operational amplifier 58 connected to lead 12 via diode 58a with feedback 58b. The startup control 20 has an operation amplifier 36, diode 37 and feedback circuit 38.

Amplifier 30, 33, 58, 36, together with the diodes 31, 34, 37 poled as shown with respect to the common bus 12, function in the following manner. Whichever of the amplifiers 30, 33, 58, 36 has the least negative error voltage existing at its input, i.e., the input which would provide the least positive voltage at its output, will be in control, i.e., will establish the output voltage on lead 12 and therefore determine the fuel flow rate of fuel controller 11.

Temperature control 14 includes an exhaust temperature averaging device 39 which serves to average the various exhaust temperatures sensed by sensors 9 (FIG. 1) and to provide a single exhaust temperature signal to amplifier 40.

A function of exhaust temperature 40 is obtained in function generator 41 and applied as a variable setpoint to the input of amplifier 30 through impedance 42. The function generated by device 41 is a temperature ramp, starting at a suppressed preset exhaust temperature, and going up to a preset final value (see graph 13, FIG. 1). The major or steady state feedback path is via a resistor 46, while transient gain is affected by a feedback circuit consisting of resistor 44 and capacitor 45. The setpoint for amplifier 30 is adjustable with a knob 43 controlling an adjustable voltage divider.

Referring next to the speed and load control 15, a signal having a frequency proportional to turbine speed from inductor alternator 17 is applied to transducer 48 which converts the signal into a current proportional to frequency. This is amplified at 49 and applied to an input impedance 50 connected to the input of operational amplifier 33 as a signal representative of actual speed. Similarly, a voltage representative of desired speed selected by external knob 51 is applied to a second input impedance 52. The gain of the feedback path 35 is adjustable as indicated at 53 in order to set the droop, i.e., tendency of turbine speed to decrease with increase in load. The response characteristics may be altered to provide for isochronous control by means of relay 47 which changes the feedback circuit characteristics. The purpose of the speed droop is, as is well known to those skilled in the art, to provide stability and ability of the turbine to share load when it is interconnected with other prime movers.

In order to insure that a minimum flow of fuel is always applied to the combustion chambers, thus maintaining fire therein, a minimum signal by-pass circuit is associated with the speed and load control 15. This is shown schematically as diode 54 connected to a negatively-sourced voltage divider 55. Thus if the voltage on lead 12 drops to a value selectable by potentiometer 55, diode 54 will cease to be back-biased and current will flow from the summing junction of amplifier 33 to maintain the lead 12 voltage at a minimum value.

Referring now to the acceleration control 18, the speed signal at the output of amplifier 49 is differentiated with respect to time to give an acceleration signal. The manner in which this is done may include a capacitor 56 connected to amplifier 49 on one side and to a reference via a resistor 57 on the other side. The voltage between 56, 57 is representative of actual acceleration of the turbine and is applied as one input to amplifier 58. An adjustable voltage source representative of desired acceleration selectable by external knob 59 is applied as the other input to amplifier 58. The output from amplifier 58 is connected via diode 58a to the common lead 12.

Referring now to the start-up control 20, the input to operational amplifier 36 is an event-sequenced programmed high impedance voltage source. This is shown generally as 61 and is connected to the amplifier via input impedance 62. Programmed source 61 is indicated schematically by means of relays arranged to connect various levels of negative DC polarity from a voltage divider 63 with adjustable taps 72, 73, 74, to a common lead 64 via diodes 65. In actuality, solid state switching devices are preferably employed. The description in the drawing is merely for illustrating the invention. A first relay 66 is actuated at firing speed (about 20% speed and corresponding to B on FIG. 2). A second relay 67 is actuated to open upon detection of flame in the combustion chamber by flame detector 22. A third relay 68 is timed to open at a specified time, say, one minute, after flame detection. A fourth relay 69 is arranged to close at 95% speed.

Thus relays 66–69 are sequenced by certain events which depend upon the operating condition of the turbine, i.e., the attainment of 20% speed, flame detection, fixed time after flame detection, and 95% speed. Other conditions or events could be selected as well. During the time between events, the fuel signal from the start-up control 20 is open loop (or uneffected by the condition of the turbine until the next event occurs). The fuel signal either remains constant or changes in a time-dependent manner.

Diodes 65 are poled with respect to common lead 64 so that the most negative voltage applied to any one of the diodes is gated, i.e., this most negative voltage is applied to the input impedance 62.

It remains to note that a maximum signal limiting device is included at 70. This includes an emitter follower circuit to prevent the voltage V on lead 12 from rising any higher than the setting on tap 71.

It should also be noted that there are signal lights 72a–75a associated with the output leads from amplifiers 30, 33, 58, 36 respectively. These may be located on the control panel and when lighted, they indicate which one of the amplifiers is in control, and thus which of the channels I, II, III or IV is controlling the turbine.

OPERATION

The operation of the invention is as follows. The start-up control 20 generates an open loop event-sequenced fuel control signal as indicated by graph 21 on FIG. 1, in the following manner. Referring first to the programmed voltage source 61 of the start-up control at the bottom of FIG. 3, and remembering that the most negative voltage applied to the cathodes of diodes 65 controls the voltage on lead 64, the relays 66–69 are so positioned on the drawing that they will be actuated from top to bottom during a normal start.

At firing speed, relay 66 opens and the voltage drops from ground potential to a negative voltage determined by tap 72. The inverted or positive signal appears at the output of amplifier 36 to call for an initial flow of fuel to the combustion chambers (see line portion 66' on graph 21 in FIG. 1). When ignition is achieved and flame is detected, relay 67 opens and the voltage on lead 64 is now a less negative voltage as set by tap 73. The inversion of the signal by the amplifier 36 causes the fuel control signal to appear as it does in line portion 67', graph 21 and corresponds to a fuel flow suitable for warm-up.

One minute after flame is detected, relay 68 opens. The RC network of amplifier circuit 68a causes the voltage to increase on a time constant curve toward a final, more negative value set with tap 74. This phase is indicated by line portion 68' in graph 21. At 95% speed, relay 69 closes to impose a full negative potential on lead 64. This would result in the maximum value of fuel control signal as shown by line portion 69'.

The event-sequenced start-up control is constrained or limited by closed loop operation of the acceleration control, temperature control and speed/load control at various times during start-up and loading.

First, the acceleration control 18 is set to accelerate the turbine at a constant selectable rate determined by the reference setting knob 59. The acceleration amplifier 58 receives an input of an actual acceleration signal. When acceleration exceeds a selected value, the fuel control signal is reduced and varied so as to hold acceleration constant. This action is indicated on graph 19 of FIG. 1. Reference to FIG. 2 for a typical start shows the acceleration control to be functioning during the event interval E–F.

Turning now to the speed and load control 15, a voltage representative of actual speed is applied to input impedance 50 of amplifier 33 and compared with a reference speed signal applied to input impedance 52. The result is a sharply discriminating fuel control signal over a range centered about rated speed. This is indicated on the graph 16 by line portion 75 which is drawn with respect to the $n$ scale. As the turbine is loaded, fuel must be further increased to maintain the selected speed. This is indicated on the other horizontal L scale in curve 16 by line portion 76. The slope of line portions 75, 76 (depending upon the mode in which the turbine is operating) can be adjusted with feedback resistor 53.

Turning now to the temperature control 14, a function of actual temperature is generated in the function generator 41 and the voltage is applied to input impedance 42. When matched with temperature setting on an adjustable voltage source set by knob 43, the resulting curve is reflected in graph 13, showing reduction in the fuel signal (line 77), reflecting a sharp rise in temperature as the turbine is ignited. The scheduled output then permits a gradual increase of allowable fuel which will not exceed a rate of increase toward a peak temperature set in function generator 41 (line portion 78). Line portion 79 then indicates a reduced flow of fuel (at constant speed) as load is increased in such a manner as to maintain a specified turbine exhaust temperature.

It will be observed that the requested fuel control signals from the controllers 14, 15, 18, 20 are all applied simultaneously to the low value gate. Since only the lowest of these is "gated" or allowed to control at any one time, the solid line on graph 23 at the output of gate 12 indicates this requisite. On the other hand, it should be observed that the non-controlling functions (indicated by dotted line) are present in the event that there is a failure of components providing the controlling signal over that given range of gas turbine operation.

The indicating lights 72a, 73a, 74a, 75a are only lighted when the particular controller associated with the light is in control of the turbine. Even though all signals are simultaneously applied to gate 12, only one of the amplifiers 30, 33, 58, 36 is in control at once, but the others are ready to take over in case of failure.

The invention provides a very flexible control system which allows simultaneous control by an event-sequenced open loop start-up control, along with a number of constraining closed loop controls. The latter prevent occurrence of conditions which might damage the turbine while achieving start-up in the minimum time.

What is claimed is:

1. In a gas turbine control system having servo means to control fuel flow to the combustion chambers in accordance with an electrical fuel control signal, the combination comprising:
  first start-up control means generating a first programmed open loop event-sequenced fuel control signal, said first control means being sequenced by a plurality of preselected events normally taking place sequentially during turbine startup,
  a plurality of additional closed loop control means, each continuously responsive to a different operating condition of the gas turbine and each arranged to supply a respective fuel control signal for controlling the respective operating condition, and
  gating means connected to be responsive to said first control signal and also to said plurality of operating condition control signals and enabling only the one of said fuel control signals representing the least fuel to control said fuel flow servo means.

2. The combination according to claim 1, wherein said first means is responsive to presence of flame in the combustion chamber and to a plurality of discrete turbine speeds.

3. The combination according to claim 1, wherein said control means and said gating means comprise a plurality of operational amplifiers connected through diode means to a common gating bus, said bus being also connected to the input of said fuel flow servo means.

4. The combination according to claim 1, wherein one of said additional control means is arranged to supply a fuel control signal which is dependent upon the rate of change of exhaust tempeature of the gas turbine during startup.

5. The combination according to claim 1, wherein one of said additional control means is arranged to supply a fuel control signal which limits acceleration to a selected value.

6. The combination according to claim 1, wherein said first means includes a plurality of devices responsive to discrete events and arranged to provide reference signals corresponding to proper fuel flow for those events, said device being connected through diode means to a common gating bus.

7. In a gas turbine control system having servo means to control fuel flow to the combustion chambers in accordance with an electrical fuel control signal, the combination of:
  first start-up control means generating a first programmed open loop event-sequenced fuel control signal, said first control means being sequenced by a plurality of preselected events taking place sequentially during normal start-up of the gas turbine,
  second means supplying a second fuel control signal for controlling fuel to obtain a desired turbine speed,
  third means supplying a third fuel control signal for controlling fuel to obtain a selected temperature condition in the gas turbine,
  fourth means supplying a fourth fuel control signal for controlling fuel to obtain a selected acceleration characteristic of the gas turbine, and
  gating means connected to be continuously responsive to said first, second, third and fourth means and enabling only the one of said electrical fuel control signals calling for the least fuel to control said fuel flow servo means.

References Cited
UNITED STATES PATENTS

| | | | |
|---|---|---|---|
| 2,941,359 | 6/1960 | Miller et al. | 60—39.28 |
| 2,971,337 | 2/1961 | Wintrode | 60—39.28 |
| 2,971,338 | 2/1961 | Bodemuller | 60—39.28 |
| 2,974,483 | 3/1961 | Sanders | 60—39.28 |
| 3,097,489 | 7/1963 | Eggenberger et al. | 137—30 X |
| 3,151,450 | 10/1964 | Blackaby | 60—39.14 |
| 3,295,317 | 1/1967 | Blackaby | 60—39.28 |
| 3,340,883 | 9/1967 | Peternel | 137—17 X |
| 3,365,881 | 1/1968 | McKenzie | 60—39.14 |

AL LAWRENCE SMITH, Primary Examiner

U.S. Cl. X.R.

60—39.28